July 11, 1967     K. W. LEFEVER     3,330,058
IDENTIFICATION MEANS AND APPARATUS FOR INSTALLING
Filed Aug. 24, 1964     3 Sheets-Sheet 1
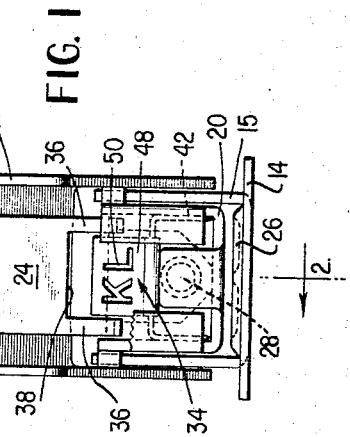
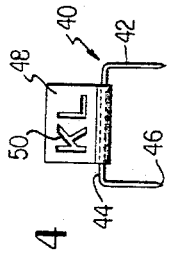
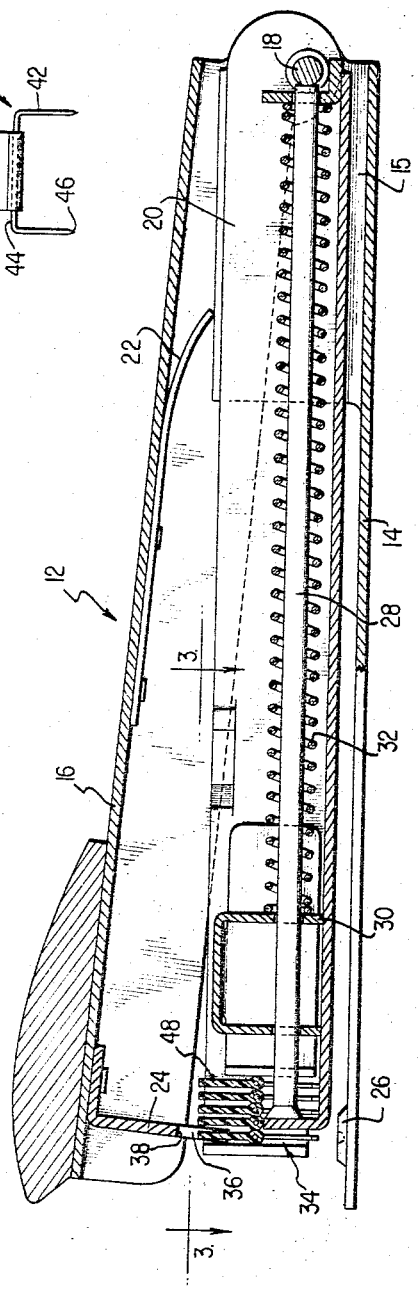
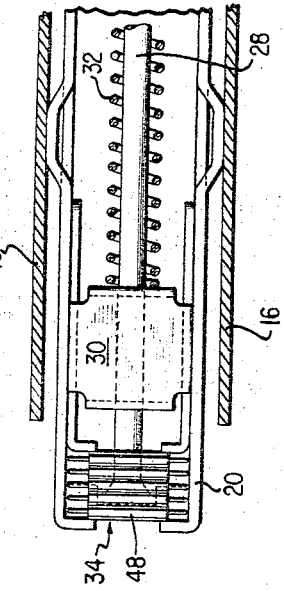
INVENTOR.
KENNETH W. LEFEVER
BY *Kenyon, Palmer, Stewart & Estabrook*
ATTORNEYS.

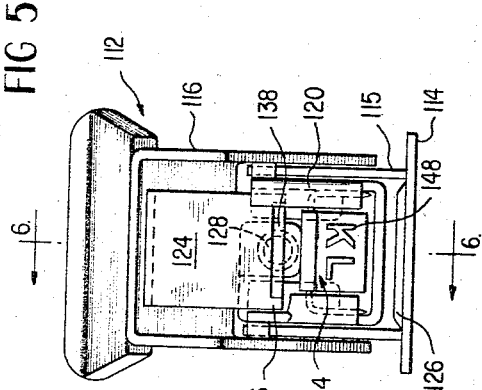
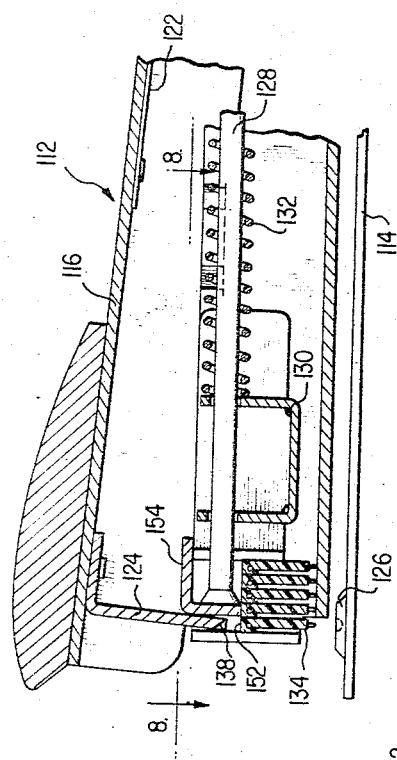
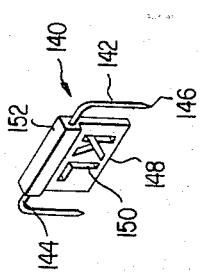
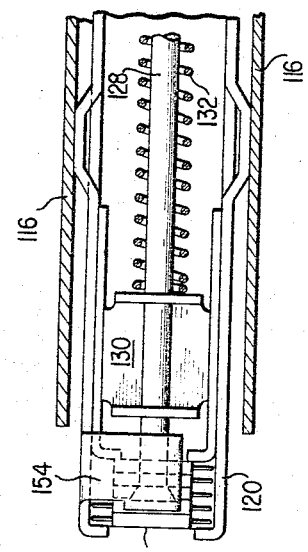
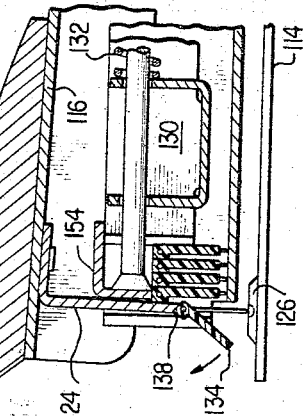
INVENTOR.
KENNETH W. LEFEVER
ATTORNEYS

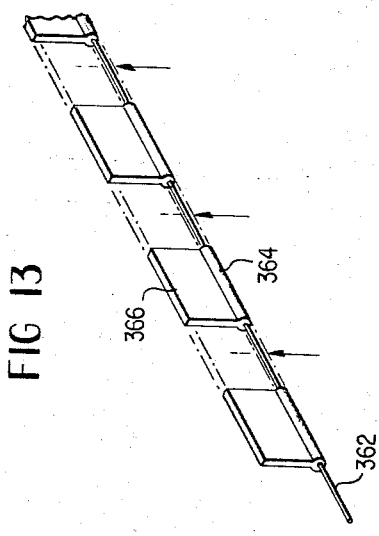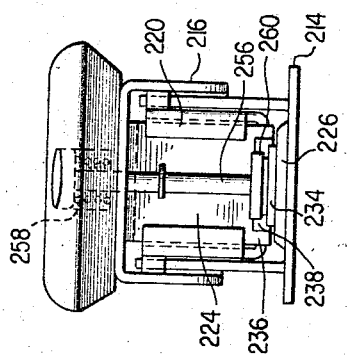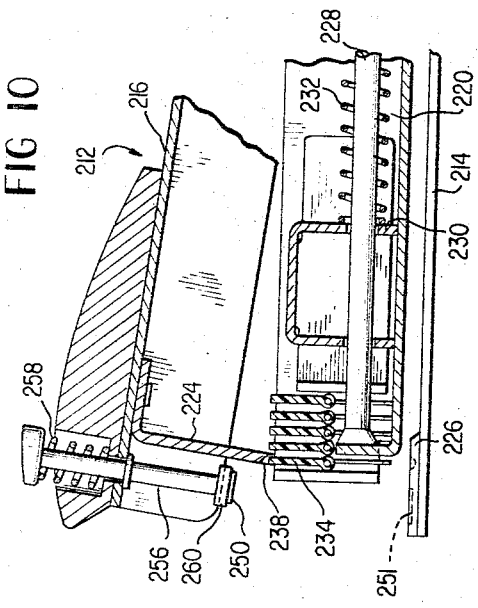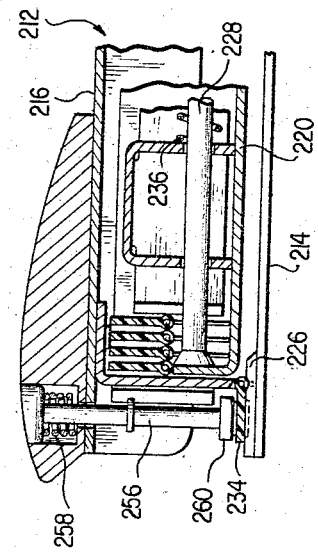

United States Patent Office 3,330,058
Patented July 11, 1967

3,330,058
IDENTIFICATION MEANS AND APPARATUS
FOR INSTALLING
Kenneth W. Lefever, 5914 Anniston Road,
Bethesda, Md. 20034
Filed Aug. 24, 1964, Ser. No. 391,498
17 Claims. (Cl. 40—25)

This invention relates broadly to identification means for use with fasteners and in particular to a novel identification tab affixed to a staple-type fastener and a device for affixing such a tab.

The value of staplers used to fasten letters, memos and other informational disseminating or storing media would be greatly inhanced if the fastener structure itself were to be provided with means to carry some distinguishing identifying or advertising means, either preinscribed on the fastener or inscribed at the time of affixing thereof by the fastener installing device.

It is an object of this invention to provide an identification device which can be affixed to objects to be identified with an ordinary stapler.

It is also an object of this invention to provide a means for carrying a distinguishing mark to identify or advertise the origin, routing or destination of a fastened object on a staple-type fastener.

It is another object of this invention to provide an identification tab which is pivotally mounted on a staple-type fastener so that the fasteners may be stacked in magazine form prior to use and yet be swiveled to a flat coplanar relationship when the fastener is affixed to an object.

It is a further object of this invention to provide a tabbed staple which may be affixed by existing stapling machines with a minimum of modification thereto.

It is still another object of this invention to provide a simple and inexpensive method of forming tabbed staples.

It is still a further object of this invention to provide a stapler for affixing staples tabbed in accordance with the invention.

It is yet another object of this invention to provide an apparatus for fastening staples tabbed in accordance with the invention, the apparatus having means to simultaneously or concurrently mark the stapled tabs with distinctive indicia.

These and other objects of the invention will become better understood by reference to the following detailed description when viewed in light of the accompanying drawings in which like reference numerals indicate like parts throughout the figures thereof and wherein:

FIGURE 1 is an elevational end view of a stapler in accordance with the invention;

FIGURE 2 is a sectional view of the stapler of FIGURE 1 taken along the line 2—2 thereof;

FIGURE 3 is a sectional view of a stapler of FIGURE 2 taken along the line 3—3 thereof;

FIGURE 4 is an elevational view of one of the staples in accordance with the invention for use in the staplers of FIGURES 1 through 3;

FIGURE 5 is a front elevational view of another stapler in accordance with the invention;

FIGURE 6 is a sectional view, partly broken away, of the stapler of FIGURE 5 taken along the line 6—6 thereof showing the stapler in an unactuated condition;

FIGURE 7 is a view similar to FIGURE 6 showing a stapler and staple in a partly actuated condition;

FIGURE 8 is a sectional view of the stapler of FIGURE 6 taken along the line 8—8 thereof;

FIGURE 9 is a perspective view of one of the staples in accordance with the invention for use in the embodiments of FIGURES 5 through 8;

FIGURE 10 is an elevational view in section and partly broken away of still another stapler in accordance with the invention in an unactuated condition;

FIGURE 11 is a view similar to FIGURE 10 showing the stapler in a fully actuated condition;

FIGURE 12 is a front elevational view of the stapler of FIGURE 11; and

FIGURE 13 is a perspective view of staples in accordance with the invention during the fabrication thereof.

Referring now to FIGURES 1 through 3 of the drawings, a stapler adapted to install staples in accordance with the invention is shown generally at 12. It should be understood that the particular stapler which may be used with this invention could be of any of the types in common use at present and, as the case illustrated, could be of a standard magazine type modified for use with the invention. The stapler exemplified is made up of a base 14 which had affixed to one end thereof a hinge support 15, which in turn has mounted thereon a driver member 16, pivotal on a hinge 18. A staple magazine 20 is disposed between the base 14 and the driver member 16 to provide a container for staples for the machine. A flat spring 22 is disposed between the driver member 16 and the hinge support 15 to provide spring biasing of the driver member in an upward disposition. Extending from the driver member, opposite the hinged end thereof, is a driver tongue 24 which cooperates with an anvil 26 mounted therebeneath on the base 14, to secure the staples to the objects to be attached. Disposed within the staple magazine 20 is an alignment rod 28 which, has mounted thereon, a staple follower 30 biased in a forward disposition by a coil spring 32 coiled around the alignment rod 28. A package of staples in accordance with the invention, generally shown at 34, is disposed within the magazine 20.

The stapler, as thus far described, is in accordance with staplers of the prior art. The modification of the stapler to utilize staples in accordance with the invention involves a variation in the driver tongue 24 and consists of the provision of a rectangular notch in the lower edge of the driver member to provide depending driver arms 36 and a transverse surface 38 defining the notch.

Referring now more particularly to FIGURE 4 of the drawings, a staple in accordance with the invention is shown generally at 40. The staple is made up of a wire which, as is usual in staples, has depending arms 42 connected together by a cross member 44, the depending arms ending in points 46. A tab 48 is hingedly connected to the cross member 44 and has disposed thereon, an identifying mark 50. This mark may take the form of cut-out lettering as shown, a stamped mark or letter or a painted or etched identification as desired.

In operation, the staples, disposed in the magazine of the stapler 12 in the usual manner, with the tabs 48 in a vertical configuration, are biased forwardly in the magazine by the follower 30 and the coil spring 32. The cut-out portion of the driver tongue 34 is so dimensioned that the driver arms 36 engage the cross member 44 of the lead staple in the package 34 on either side of the tab 48 when the driver 16 is depressed thereby forcing the staple into the anvil 26 to provide fastening therefore. The transverse surface 38 of the driver tongue is so spaced from the lower faced of the arms 36 that it clears the upper portion of the tab 48 during the stapling operation. Once the staple is in place, the tab 48 may be swiveled to a coplanar relationship with the item to which it is fastened.

Referring now to FIGURES 6 through 9, another embodiment of the invention is shown. In the embodiment of these figures, parts corresponding to the parts of previously described embodiment are indicated by like numbers only of the next higher series. One of the primary variances in this form of the invention lies in the formation of the slot in the driver tongue 124 to handle a variation in the staple of the invention. In the embodiment shown, the slot comprises an angled transverse surface 138 while the driver arms 136 consist of foreshortened versions of the driver arms of the preceding figures.

With specific reference to FIGURE 9, the staple of this embodiment comprises a wire having depending arms 142 connected by transverse member 144 with a tab 148 depending therebetween and hingedly conected to the transverse member. The tab, in this version, is provided with a flat surface 152, aligned perpendicular to the arms 142 and disposed on the hinge point between the tab and the wire. When disposed in the stapler, as shown in FIGURE 6, the flat surface 152 of the tab of the lead staple is directly beneath the angled surface 138 of the driver tongue 124. A guide member 154 is disposed directly behind the tongue 124 to insure alignment of the tongue and surface 138 with the flat surface 152 of the stapler.

In operation, and with specific reference to FIGURE 7, the driver tongue, when depressed contacts the flat surface 152 of the staple at the angled surface 138 thereof and, due to the imbalance of the force imposed thereon induced by the angled surface, rotates the tab 134 towards a horizontal direction as shown. The driver arms 136, contacting the cross member 144 as in the previous figures, press the staple arms 142 against the anvil 126 to deform the staple and provide fastening thereof. The primary function of the modification of the stapler shown in this embodiment is to move the tab of the staple from its initial position depending between the legs thereof to an essentially horizontal position to avoid interference with the stapling deformation of the depending arms 142.

Referring now to FIGURES 10 through 12 of the drawings, a still further embodiment of the stapler incorporating features in accordance with the invention is shown at 212. In this embodiment, as in the prior embodiment, parts corresponding to the parts of the previous embodiments are indicated by like reference numerals only of the next higher series. The primary distinction in this embodiment lies in the addition of a device for embossing the indicia on blank tab staples at the time of stapling. This may be done in various ways and it is primarily contemplated that a cooperating male and female die actuable prior to, simultaneously with or subsequent to the actual stapling operation will be utilized to emboss the desired indicia on the like tab of the staple. In the embodiment shown this is accomplished by a plunger 256 which is mounted in the end of the driver member 216 and is actuable between an upward position shown in FIGURE 10 and a downward position shown in FIGURE 11 of the drawings. This plunger is biased in an upward position by spring 258 coiled therearound and may be actuatable to a downward position either manually or automatically as desired.

The plunger carries, on the lower end thereof, a die 260 which has a male indicia 215 on the lower surface thereof, while the anvil 226 has included therein a cooperating female indicia 251.

The driver tongue 224 is formed in much the same manner as the previous embodiment and is provided with angled transverse surface 238 having driver arms 236 depending on either side thereof. In operation, the driver member 216 is actuated and, simultaneously, the angled surface 238 rotates the tab 234 of the first staple towards a horizontal position. After this the driver arms 236 drive the staple into the anvil 226 to provide fastening thereof. At this point the tab 234 is disposed in a horizontal condition over the anvil 226, and the plunger 256 is actuated to drive the male indicia 250 into the tab and, in cooperation with the female indicia 251, to deform the tab and emboss the indicia thereon.

It should be obvious that the plunger may be powered to operate automatically and that a plurality of indicia may be provided on a wheel or like structure, the indicia being changeable to provide dating, routing or any other variable informational material.

The tab is preferably made of a material, such as polyvinyl chloride, which undergoes a color change when subjected to cold flow, so that the deformation caused by the indicia on the die will result in the indicia being embossed in a distinctive manner on the tab.

FIGURE 13 illustrates staples in accordance with the invention during the fabrication thereof. The staples initially comprise a wire 362 upon which a casing 364 and a transverse fin 366 have been molded as shown. Intermediate portions of the casing and fin have been removed and the remaining portions then form the tab and hinge of the staple. The wire is then suitably severed at points indicated by the arrows in the figure and the staples are finally formed by bending these wires to define the depending arms and cross member of the staple. The wire may be severed at an angle so that the points of the staple are automatically formed by the severing operation. The casing and fin may be molded on the wire by injection molding, extrusion, casting or any of the other methods well known in the art. As stated before the material of the tabs, if the tabs are to be provided in a blank condition for embossing with indicia at the time of installation, should be of a material having properties of polyvinyl chloride. If the indicia is to be installed at the time of fabrication or at a time prior to sale, this may be accomplished in any of the well-known embossing, printing or stamping operations and the material attached in this case may be any material plastic or otherwise which is suitable for such forming. A benefit may be realized by forming the tabs of a thermoplastic or thermoset plastic in that adhesion of the adjacent staples may be accomplished by heat tacking the adjacent hinges together and avoiding the necessity of a separate adhesive as is required in the prior art.

The tabs may, of course, be of any desired shape. For example the tabs may be formed from a pair of fins extending in opposite directions from the wire, they may be oval, square, oblong, or any other suitable or desired configuration.

It should also be obvious that the self-embossing feature of the last-described embodiment may be incorporated in the previously described embodiments and that the particular features of the various embodiments may be interchanged at will. For example, in the embodiment of FIGURES 1 through 3 paint or ink embossing could be incorporated in the stapler to mark the tab of the leading staple prior to stapling while that tab is in the vertical condition.

What has been described above is intended primarily to aid those skilled in the art in the practice of the invention and it should therefore be understood that, within the scope of the appended claims, the invention may be practiced otherwise than as specifically described.

What is claimed as new and desired to be protected by Letters Patent of the United States is:

1. An identifying means adapted to be affixed to objects to be identified comprising a tab for bearing distinctive indicia, said tab being formed to include a transverse tubular member disposed proximate one edge thereof, a staple having a transverse cross member with a pointed leg depending from each end thereof for fastening said tab to the object to be identified, said cross member being disposed through said tubular member to provide a pivotal connection between said tab and said staple, said cross member further being greater in length than said tubular member, the relative transverse dimension of said tab and the transverse spacing of said legs being such that said legs are outwardly spaced from the plane of the edges of said tab to thereby provide a transverse driving surface along said cross member, at least said cross member being circular in cross section and of such size to slidably engage the inner periphery of said tubular member throughout the entire inner surface thereof.

2. An identification means adapted to be affixed to objects to be identified comprising a flat rectangular tab for bearing distinctive indicia, a transverse tubular member disposed along one edge of said tab and formed to be integral therewith, said tubular member having a rectangular outer periphery and a cylindrical inner periphery thereto, a staple having a transverse cross member with a pointed leg depending from each end thereof for fastening said tab to the object to be identified, said cross member being cylindrical in cross section and disposed through said tubular member to pivotally connect said staple to said tab, said cross member being greater in length than said, the relative transverse dimension of said tab and the transverse spacing of said legs being such that said legs are outwardly spaced from the plane of the edges of said tab to thereby provide a transverse driving surface along said cross member, said cross member being configured in cross section to slidably engage the inner periphery of said tubular member throughout the entire area thereof.

3. The method of making a tabbed identification means having a staple for affixing the tab to objects to be identified comprising the steps of:
forming a generally rectangular cross sectional strip to completely enclose an elongated bendable wire throughout the length thereof, removing alternate sections of said strip to uncover alternate portions of said wire, severing said wire at the uncovered portions thereof, bending the uncovered portions of said wire between the free ends thereof at a point adjacent the remaining portions of said strip so that said uncovered portions extend in the same direction with respect to one another and are disposed in a coplanar fashion with respect to the remaining portions of said strip.

4. A method in accordance with claim 3 wherein the uncovered portions of said wire extend in the same direction as the remaining portion of said strip.

5. A method in accordance with claim 3 wherein the uncovered portions of said wire extend in the opposite direction from the remaining portion of said strip.

6. A method in accordance with claim 3 wherein said strip is formed around said wire by extruding plastic material around said wire in an extruding die.

7. A method in accordance with claim 3 wherein said strip is formed around said wire by injecting a plastic material into a mold in which said wire is disposed.

8. A claim in accordance with claim 3 wherein said strip is formed by casting a plastic material around said wire.

9. A method in accordance with claim 3 wherein the remaining portions of said tabs are further bonded together over a portion of the surface area thereof to form a package of said identifying means.

10. In a magazine-type stapling machine for sequentially affixing a package of identification staples which have tabs swively connected to the midportion and legs depending from either end of the cross member thereof, means to depress the cross member of the staple and deform the legs thereof comprising a driver tongue disposed above and an anvil disposed beneath the lead staple of the staple package, said tongue being vertically actuatable between a first position above said lead staple and a second position proximate said anvil to depress said staple into said anvil, said tongue having legs depending from either end thereof and disposed to engage the cross member of said staple on either side of said tab, said legs terminating in a flat transverse driving surface at the lower ends thereof.

11. A stapling machine in accordance with claim 10 wherein means are further provided to mark the tab of said staple.

12. A stapling machine in accordance with claim 10 wherein said legs are greater in length than the height of said tab.

13. A stapling machine in accordance with claim 10 wherein the length of said legs is less than the height of said tab above said cross member and wherein means are provided to deflect said tab before said legs engage the cross member.

14. A stapling machine in accordance with claim 13 wherein said means comprises an angular surface on the lower portion of said tongue between said cross members, said angular surface disposed to deflect said tab out of the path of said tongue when said angular surface is in engagement therewith.

15. A stapling machine in accordance with claim 14 wherein said means to mark the tab comprise a marking means disposed adjacent said tongue, said marking means being actuatable to mark said tab after said tab has been deflected by said angled member.

16. An identifying means adapted to be affixed to objects to be identified comprising a tab for bearing distinctive indicia, said tab being formed to include a transverse tubular member disposed proximate one edge thereof, a staple having a transverse cross member with a pointed leg depending from each end thereof for fastening said tab to the object to be identified, said cross member being disposed through said tubular member to provide a pivotal connection between said tab and said staple, said cross member further being greater in length than said tubular member, the relative transverse dimension of said tab and the transverse spacing of said legs being such that said legs are outwardly spaced from the plane of the edges of said tab to thereby provide a transverse driving surface along said cross member.

17. An identifying means in accordance with claim 16 wherein said tab is shorter in length than said pointed legs and wherein said tab is initially disposed between said legs.

References Cited

UNITED STATES PATENTS

| | | | |
|---|---|---|---|
| 198,689 | 12/1877 | Roulstone | 40—25 |
| 691,361 | 1/1902 | Davis. | |
| 2,813,269 | 11/1957 | Jacobs. | |
| 2,923,938 | 2/1960 | Rinehardt | 227—77 X |

EUGENE R. CAPOZIO, *Primary Examiner.*

W. J. CONTRERAS, *Assistant Examiner.*